(12) United States Patent
Muto

(10) Patent No.: US 7,637,487 B2
(45) Date of Patent: Dec. 29, 2009

(54) XY GUIDE TABLE

(75) Inventor: Katsuyoshi Muto, Tokyo (JP)

(73) Assignee: THK Co., Ltd., Tokyo (JP)

( * ) Notice: Subject to any disclaimer, the term of this patent is extended or adjusted under 35 U.S.C. 154(b) by 23 days.

(21) Appl. No.: 11/629,217

(22) PCT Filed: Jun. 13, 2005

(86) PCT No.: PCT/JP2005/010779

§ 371 (c)(1),
(2), (4) Date: Dec. 14, 2007

(87) PCT Pub. No.: WO2005/124789

PCT Pub. Date: Dec. 29, 2005

(65) Prior Publication Data

US 2008/0217828 A1    Sep. 11, 2008

(30) Foreign Application Priority Data

Jun. 15, 2004  (JP) .............................. 2004-176498

(51) Int. Cl.
*B23Q 1/25* (2006.01)
(52) U.S. Cl. ..................... 269/55; 269/289 R
(58) Field of Classification Search ............. 269/73, 269/71, 21, 289 R, 55
See application file for complete search history.

(56) References Cited

U.S. PATENT DOCUMENTS

| | | | | |
|---|---|---|---|---|
| 4,409,860 A | * | 10/1983 | Moriyama et al. | 74/490.09 |
| 4,492,356 A | * | 1/1985 | Taniguchi et al. | 248/346.06 |
| 4,766,465 A | * | 8/1988 | Takahashi | 355/53 |
| 4,768,698 A | * | 9/1988 | Brown et al. | 228/18 |
| 4,896,869 A | * | 1/1990 | Takekoshi | 269/60 |
| 5,022,619 A | * | 6/1991 | Mamada | 248/187.1 |
| 5,363,774 A | | 11/1994 | Anada et al. | |

(Continued)

FOREIGN PATENT DOCUMENTS

GB  2163494 A  2/1986

(Continued)

OTHER PUBLICATIONS

International Preliminary Report on Patentability for PCT/JP2005/010779 mailed on Mar. 1, 2007.

(Continued)

*Primary Examiner*—Lee D Wilson
(74) *Attorney, Agent, or Firm*—Westerman, Hattori, Daniels & Adrian, LLP.

(57) ABSTRACT

Provided is an XY guide table in which rigidity of portions thereof where ball rolling surfaces are formed is enhanced to thereby eliminate clearances between balls and ball rolling grooves making it possible to guide an upper plate in an X-direction and Y-direction with respect to a lower plate without involving any rattling, and which can be formed in a very thin shape. The XY guide table includes the lower plate, an intermediate plate, and the upper plate assembled with each other through intermediation of the balls. Each of the lower plate and the upper plate has a pair of rail bodies of a substantially rectangular sectional configuration and a storage groove sandwiched between the rail bodies, and is formed in a substantially channel-shaped configuration. The plates are stacked together, with the storage grooves being opposed and orthogonal to each other.

5 Claims, 6 Drawing Sheets

U.S. PATENT DOCUMENTS

| | | | | | |
|---|---|---|---|---|---|
| 5,760,564 | A | * | 6/1998 | Novak | 318/687 |
| 2002/0180133 | A1 | * | 12/2002 | Oshima | 269/73 |
| 2003/0020225 | A1 | * | 1/2003 | Mizuochi et al. | 269/73 |
| 2008/0217828 | A1 | * | 9/2008 | Muto | 269/55 |

FOREIGN PATENT DOCUMENTS

| | | | |
|---|---|---|---|
| JP | 1984-24226 | U | 2/1984 |
| JP | 24226/1984 | U | 2/1984 |
| JP | 1989-106136 | U | 7/1989 |
| JP | 106136/1989 | U | 7/1989 |
| JP | 05-018415 | | 1/1993 |

OTHER PUBLICATIONS

European Search report dated Aug. 11, 2008 issued in corresponding European Application No. 05748842.1.

International Search Report of PCT/JP2005/010779 date of mailing Sep. 20, 2005.

* cited by examiner

XY GUIDE TABLE

TECHNICAL FIELD

The present invention relates to an XY guide table mounted to a stationary portion such as an apparatus housing, for freely guiding a movable member such as a product inspection stage or a machining table, in an X-direction and a Y-direction, and more particularly, to a small and high precision XY guide table suitable for small load uses.

BACKGROUND ART

Conventionally, a so-called built-up type XY guide table utilizing a linear guide device has been known as a device for freely moving a work table of a machine tool in the X-direction and the Y-direction, which are orthogonal to each other. More specifically, a rail is arranged on a stationary portion, such as a bed or a column, so as to extend in the X-direction, and a lower table movable along this rail is provided; further, a rail is arranged on this lower table so as to extend in the Y-direction, and an upper table movable along the rail is provided, with the upper table being freely movable in the X-direction and the Y-direction with respect to the stationary portion.

In the XY guide table constructed as described above, a load of a linear guide device supporting movement of the lower table and the upper table is arbitrarily selected, whereby the XY guide table is flexibly applicable to various uses from small load uses to large load uses. Further, through appropriate selection of a length of the rail, it is also possible to elongate a stroke amount of the upper table. However, since the rail in the Y-direction is arranged on the lower table, which is movable in the X-direction, high rigidity is required of the lower table itself; further, the height of the XY guide table as measured from the stationary portion to the upper table cannot but be rather large, resulting in an increase in the size and weight of the XY guide table.

JP 05-18415 A discloses an XY guide table in which a reduction in size and weight is achieved through press working of a thin steel plate. More specifically, end portions of steel plates are bent and raised by press working to thereby form a lower plate and an upper plate of a channel-like configuration; further, there is formed an intermediate plate in which, of its four sides, two opposing sides are bent downwards and remaining two sides are bent upwards, with the upper plate, the intermediate plate, and the lower plate being combined with each other such that the side wall portions formed by bending are opposed to each other. Balls are arranged between the side wall portions opposed to each other, and the balls roll on the side wall portions, whereby the intermediate plate can move in the X-direction with respect to the lower plate, and the upper plate can move freely in the Y-direction with respect to the intermediate plate.

Patent Document: JP 05-18415 A

DISCLOSURE OF THE INVENTION

Problems to be Solved by the Invention

In this conventional small XY guide table, the lower plate, the intermediate plate, and the upper plate are produced by press working of thin steel plates, and ball rolling grooves are formed in the side wall portions formed by bending the steel plates. Thus, if the press working is of a rather low precision, clearances are generated between the balls and the ball rolling grooves, and the intermediate plate and the upper plate rattle with respect to the lower plate and the intermediate plate, respectively, making it impossible to move the upper plate with high accuracy with respect to the lower plate.

By selecting balls of a relatively large diameter and imparting preload to the balls rolling in the ball rolling grooves, the clearances between the balls and the ball rolling grooves are eliminated, and it is possible to prevent the above-mentioned rattling of the upper plate with respect to the lower plate. However, since the ball rolling grooves are formed in the side wall portions formed by bending through press working, selection of balls of a large diameter results in deformation of the side wall portions of the plates before the balls are brought into contact with the ball rolling grooves to be compressed, thus making it impossible to impart a sufficient preload to the balls.

Thus, it is necessary to improve the machining precision in the press working, and to enhance the rigidity of the steel plates to be formed into the above-mentioned plates. However, taking those measures will lessen advantages of press working, that is, satisfactory productivity and a low cost, resulting in an increase in a production cost of an XY guide table.

Means for Solving the Problems

The present invention has been made in view of those problems. It is an object of the present invention to provide an XY guide table in which the rigidity of the portions where the ball rolling surfaces are formed is enhanced to thereby eliminate the clearances between the balls and the ball rolling grooves, making it possible to guide the upper plate in the X-direction and the Y-direction with respect to the lower plate without involving any rattling, and which can be formed in a very thin shape.

That is, an XY guide table according to the present invention includes: a lower plate, an intermediate plate assembled to the lower plate through intermediation of a large number of rolling members and capable of moving in an X-direction, and an upper plate assembled to the intermediate plate through intermediation of a large number of rolling members and capable of moving in a Y-direction which is orthogonal to the X-direction, each of the lower plate and the upper plate has a pair of rail bodies of a substantially rectangular sectional configuration, in which mounting holes for fastening members are formed, and a connecting plate portion connecting the rail bodies, and is formed in a substantially channel-like configuration having between the pair of rail bodies a storage groove whose width corresponds to a width of the connecting plate portion, with a rolling member rolling groove being formed in a side surface of each rail body facing the storage groove, the upper plate and the lower plate are stacked together, with the respective storage grooves of those being opposed and orthogonal to each other, and the intermediate plate is formed in a substantially rectangular configuration, and has a lower half thereof loosely fitted into the storage groove of the lower plate and an upper half thereof loosely fitted into the storage groove of the upper plate, with rolling member rolling grooves being formed at positions thereof opposed to the rolling member rolling grooves formed in the rail bodies of the lower plate and the upper plate.

According to the above-mentioned technical means, the lower plate, which is fixed to a stationary portion, and the upper plate, which is fixed to a movable member, are both equipped with storage grooves and formed in a substantially channel-like configuration, and are stacked together such that the storage grooves are opposed to each other and orthogonal to each other, so it is possible to arrange the intermediate plate in a space defined by the storage grooves, and to enable the lower plate and the upper plate to be stacked together so as to be opposed to each other with a slight gap therebetween, thus making it possible to provide a very thin XY guide table.

Further, each of the lower plate and the upper plate is formed in the substantially channel-like configuration by arranging on both sides of the connecting plate portion the pair of rail bodies of the substantially rectangular sectional configuration, with the ball rolling groove being formed in the side surface of each rail body; by forming the mounting holes for the fastening members in the rail bodies, the lower plate can be fixed to the stationary portion through the intermediation of the rail bodies, and the upper plate can be fixed to the movable member through the intermediation of the rail bodies. Thus, it is possible to impart a sufficient level of rigidity to the portions of the lower plate and the upper plate where the ball rolling grooves are formed, to eliminate the clearances between the balls and the ball rolling grooves, and to prevent rattling of the upper plate with respect to the lower plate. In addition, it is also possible to impart preload to the balls, making it possible to guide the upper plate with respect to the lower plate with high rigidity and with high accuracy.

DESCRIPTION OF REFERENCE NUMERALS

1 . . . XY GUIDE TABLE, 2 . . . LOWER PLATE, 3 . . . INTERMEDIATE PLATE, 4 . . . UPPER PLATE, 5 . . . BALL, 20, 40 . . . STORAGE GROOVE, 21, 41 . . . RAIL BODY, 22 . . . CONNECTING BOTTOM PLATE, 42 . . . CONNECTING TOP PLATE

Best Mode for Carrying Out the Invention

In the following, the XY guide table of the present invention will be described in detail with reference to the accompanying drawings.

Figure 1:
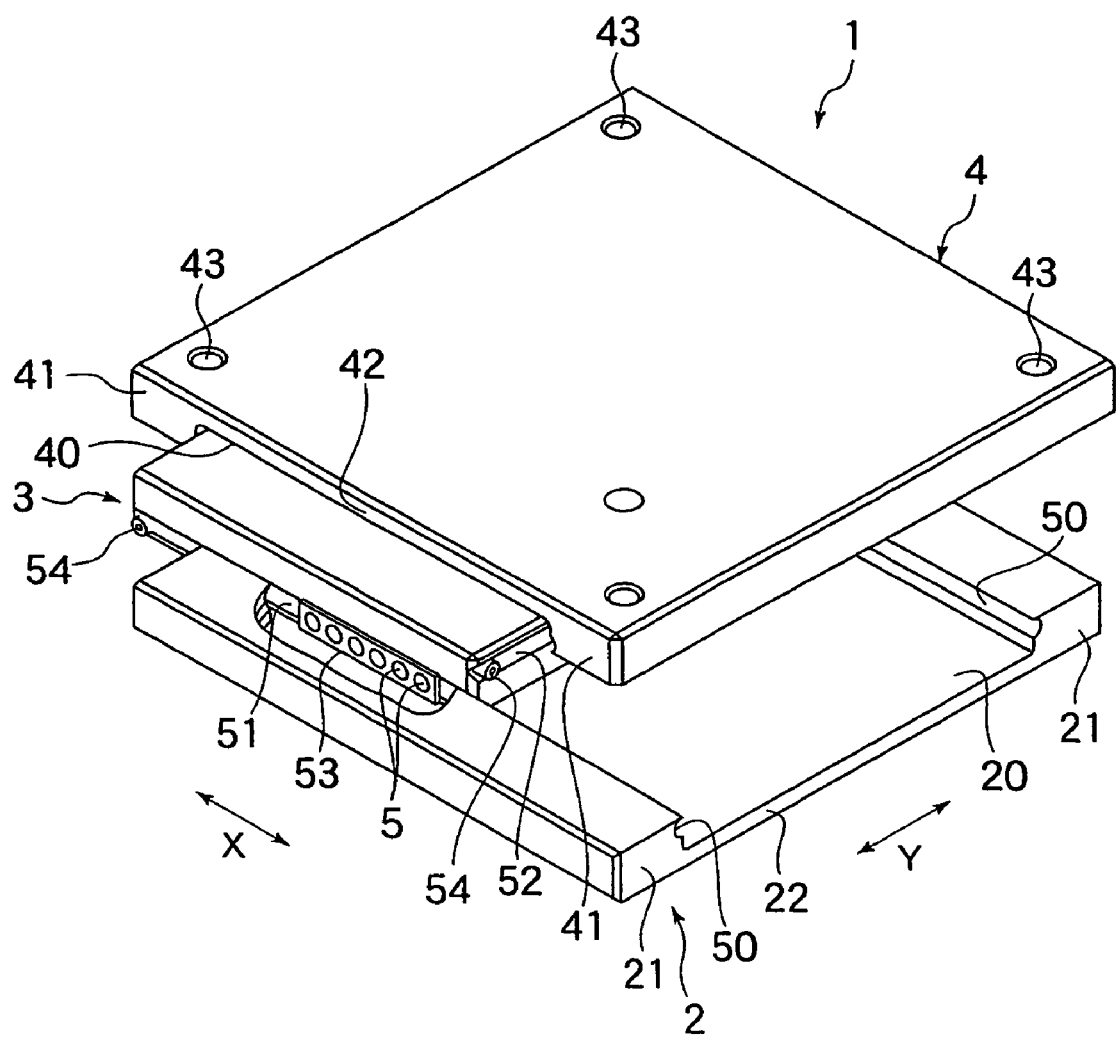
FIG. 1 is a perspective view of an XY guide table according to an embodiment of the present invention.
Figure 2:
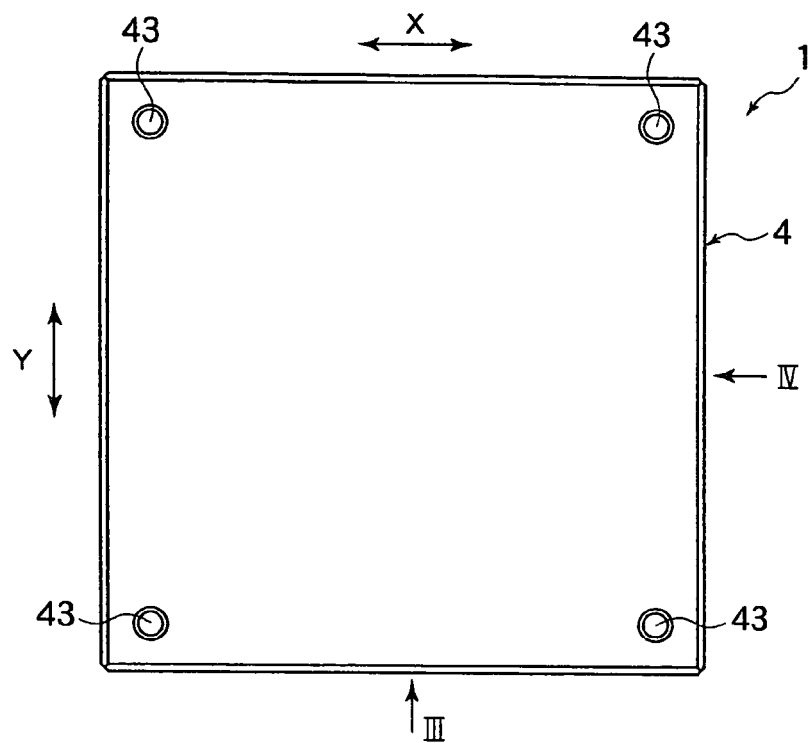
FIG. 2 is a plan view of the XY guide table shown in FIG. 1.
Figure 3:
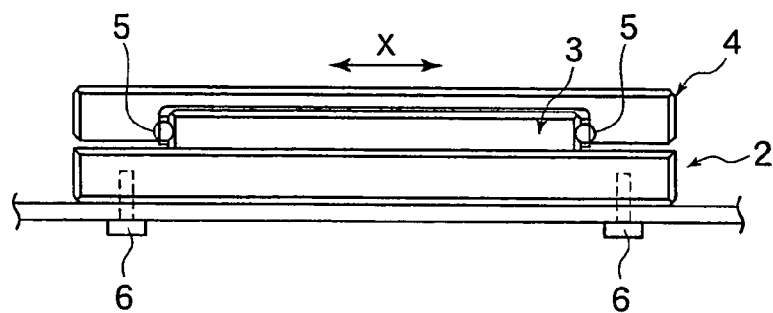
FIG. 3 is a view taken in a direction of an arrow III of FIG. 2.
Figure 4:
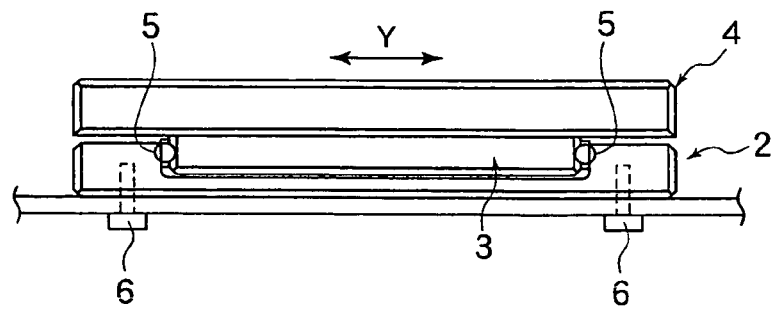
FIG. 4 is a view taken in a direction of an arrow IV of FIG. 2.

FIG. 1 is a perspective view of an XY guide table according to a first embodiment of the present invention, FIG. 2 is a plan view of this table, FIG. 3 is a view taken in a direction of an arrow III of FIG. 2, and FIG. 4 is a view taken in a direction of an arrow IV of FIG. 2.

The XY table 1 is composed of a lower plate 2 fixed to a stationary portion of a housing of a machine, a bed, etc., an intermediate plate 3 assembled to the lower plate 2 through the intermediation of a large number of balls 5, and an upper plate 4 assembled to the intermediate plate 3 through the intermediation of a large number of balls 5; the intermediate plate 3 is provided so as to be movable in an X-direction with respect to the lower plate 2, and the upper plate 4 is provided so as to be movable in a Y-direction with respect to the intermediate plate 3. Thus, when a movable member, such as an inspection stage or a conveyance table, is fixed to the upper plate 4, this movable member can be moved freely in the X-direction and the Y-direction with respect to the stationary portion.

The lower plate 2 is formed by machining a rectangular metal plate having a thickness of approximately 5 mm; at the center of its upper surface, a storage groove 20 having a width slightly larger than the width of the intermediate plate 3 is formed so as to extend in the X-direction. The ends in the X-direction of the storage groove 20 are open, so the section of the lower plate 2 taken in the Y-direction is of a substantially channel-like configuration. Further, the lower plate 2 is equipped with a pair of rail bodies 21 and 21 of a substantially rectangular sectional configuration formed on both sides of the storage groove 20, and the pair of rail bodies 21 and 21 are connected together by a connecting bottom plate 22 of a width corresponding to the width of the storage groove 20.

The upper plate 4 is formed in completely the same configuration as the lower plate 2 except that it is upside down, with a storage groove 40 being formed on the lower surface thereof; the storage groove 40 is formed so as to extend in the Y-direction, which is orthogonal to the X-direction. The lower plate 4 is formed by machining a rectangular metal plate having a thickness of approximately 5 mm; at the center of its lower surface, the storage groove 40 having a width slightly larger than the width of the intermediate plate 3 is formed so as to extend in the Y-direction. The ends in the Y-direction of the storage groove 40 are open, so the section of the upper plate 4 taken in the X-direction is of a substantially channel-like configuration. Further, the upper plate 4 is equipped with a pair of rail bodies 41 and 41 of a substantially rectangular sectional configuration formed on both sides of the storage groove 40, and the pair of rail bodies 41 and 41 are connected together by a connecting top plate 42 of a width corresponding to the width of the storage groove 40.

The rail bodies 21 and 41 of the lower plate 2 and the upper plate 4 have rolling grooves 50 for the balls 5 in the side surfaces facing the storage grooves 20 and 40. The ball rolling grooves 50 of the lower plate 2 are formed so as to extend in the X-direction, and the ball rolling grooves 50 of the upper plate 4 are formed so as to extend in the Y-direction. Those ball rolling grooves 50 exhibit a so-called Gothic-arch-shaped sectional configuration in which two ball rolling surfaces join each other at an angle of substantially 90°. Further, the rail bodies 21 and 41 are provided with tap holes 23 and 43 to be threadedly engaged with fastening screws. The tap holes 23 formed in the rail bodies 21 of the lower plate 2 are used when fixing the lower plate 2 to the stationary portion by screws, and the tap holes 43 of the upper plate 4 are used when fixing the movable member to the upper plate 4 by screws.

The intermediate plate 3 is formed in a rectangular configuration and in a thickness which is appropriately double the depth of the storage grooves 20 and 40 of the lower plate 2 and the upper plate 4; its lower half is loosely fitted into the storage groove 20 of the lower plate 2, and its upper half is loosely fitted into the storage groove 40 of the upper plate 4. In the portions of the side surfaces of the lower half of the intermediate plate 3 opposed to the ball rolling grooves 50 of the lower plate 2, there are formed ball rolling grooves 51 extending in the X-direction, and a large number of balls 5 are arranged between the ball rolling grooves 50 of the lower plate 2 and the ball rolling grooves 51 of the intermediate plate 3. Similarly, in the portions of the side surfaces of the upper half of the intermediate plate 3 opposed to the ball rolling grooves 50 of the upper plate 4, there are formed ball rolling grooves 52 extending in the Y-direction, and a large number of balls 5 are arranged between the ball rolling grooves 50 of the upper plate 4 and the ball rolling grooves 52 of the intermediate plate 3.

Each of the four ball rolling grooves 51 and 52 formed in the intermediate plate 3 has a so-called Gothic-arch-like sectional configuration in which two ball rolling surfaces join each other at an angle of approximately 90°. The balls 5 roll while applying a load between the ball rolling grooves 50 of the lower plate 2 or the upper plate 4 and the ball rolling grooves 51 and 52 of the intermediate plate 3. A group of balls 5 rolling in the same ball rolling groove are arranged at predetermined intervals in a thin-plate-like ball cage 53, and at the longitudinal ends of each of the four ball rolling grooves 51 and 52 formed in the intermediate plate 3, there protrude stopper pins 54 for locking the ball cage 53. The ball cages 53 may be formed by stamping of thin metal plates, injection molding of a synthetic resin, etc. Due to the provision of the ball cages, the balls 5 are prevented from coming off from between the upper plate 4 and the intermediate plate 3 and from between the lower plate 2 and the intermediate plate 3 when the upper plate 4 is moved in the X-direction and the Y-direction with respect to the lower plate 2.

In forming the lower plate 2 and the upper plate 4, the storage grooves 20 and 40 are first formed by cutting in rectangular metal plates of a thickness of approximately 5 mm by means of a milling machine or the like; then, the tap holes 23 and 43 are formed in the rail bodies 21 and 41, and finally, the ball rolling grooves 50 are formed by grinding. Instead of forming the storage grooves 20 and 40 in metal plates by cutting, it is also possible to produce the lower plate 2 and the upper plate 4 of a channel-like configuration by metal injection molding (MIM molding).

In the above construction, the balls 5 arranged between the lower plate 2 and the intermediate plate 3 and the balls 5 arranged between the intermediate plate 3 and the upper plate 4 roll while applying a load, whereby the intermediate plate 3 can freely move in the X-direction within the storage groove 20 of the lower plate 2, and the upper plate 4 can freely move in the Y-direction with respect to the intermediate plate 3, with the result that the movable member fixed to the upper plate 4 by screws can be freely moved in the X-direction and the Y-direction with respect to the stationary portion.

In the XY guide table of this embodiment, the upper half of the intermediate plate 3 is loosely fitted into the storage groove 40 of the upper plate 4, and the lower half thereof is loosely fitted into the storage groove 20 of the lower plate 2; further, the upper plate 4 and the lower plate 2 have the ball rolling grooves 50 in the side surfaces of the rail bodies 21 and 41 facing the storage grooves 20 and 40, and bearing portions supporting the movement of the plates 2 and 4 are positioned inside the storage grooves 20 and 40, so the upper plate 4 and the lower plate 2 are stacked together with a slight gap therebetween, whereby it is possible to form a very thin XY guide table.

Further, as shown in FIG. 4, the pair of rail bodies 21 provided on the lower plate 2 are formed in a rectangular configuration, and are fixed to the stationary portion by means of fixation screws 6; the ball rolling grooves 50 are formed in the side surfaces of the rail bodies 21. Further, a fixed distance is maintained between the pair of rail bodies 21 by the connecting bottom plate 22. Thus, if a load is applied to the ball rolling grooves 50 of the lower plate 2, the rail bodies 21, on which the ball rolling grooves 50 are formed, are not displaced. On the other hand, the intermediate plate 3, which is formed of a rectangular metal plate member having solely the ball rolling grooves 51 and 52 in its side surfaces, exhibits high rigidity and suffers no deformation if a load is applied to the ball rolling grooves 51, 52.

Thus, when the lower plate 2 and the intermediate plate 3 are combined with each other through the intermediation of the balls 5, no clearances are formed between the balls 5 and the ball rolling grooves; further, it is possible to impart preload to the balls, so it is possible to move the intermediate plate with high accuracy with respect to the lower plate.

Regarding the upper plate 4 also, the pair of rail bodies 41 provided on the upper plate 4 are formed in a rectangular configuration and are fixed to the movable member (not shown) by screws, with the ball rolling grooves 50 being formed in the side surfaces of the rail bodies 41. Further, a fixed distance is maintained between the pair of rail bodies 41 by the connecting top plate 42. Thus, if a load is applied to the ball rolling grooves 50 of the upper plate 4, the rail bodies 41, in which the ball rolling grooves 50 are formed, are not displaced. That is, as in the case of the lower plate 2, when the upper plate 4 and the intermediate plate 3 are combined with each other through the intermediation of the balls 5, no clearances are generated between the balls 5 and the ball rolling grooves 50; further, it is possible to impart preload to the balls 5, thereby making it possible to move the upper plate 4 with high accuracy with respect to the intermediate plate 3.

In this way, in the XY guide table 1 of the present invention, by enhancing the rigidity of the portions where the ball rolling surfaces 50, 51 and 52 are formed, the clearances between the balls 5 and the ball rolling grooves 50, 51 and 52 are eliminated, making it possible to guide the upper plate 4 in the X-direction and the Y-direction with respect to the lower plate 2 without involving any rattling; further, it is possible to form the table 1 in a very thin shape.

In the above-mentioned embodiment, the balls roll in the ball rolling grooves while arranged in the cages, and the stroke amount of the intermediate plate with respect to the lower plate and the stroke amount of the upper plate with respect to the intermediate plate are restricted by the length of the ball rolling grooves. However, in the XY guide table of the present invention, it is possible to enable the intermediate plate to move with respect to the lower plate without any limitations in terms of stroke by, for example, forming an endless circulation path for the balls in the intermediate plate. Similarly, it is possible to enable the upper plate to move with respect to the intermediate plat without any limitations in terms of stroke.

While in the above-mentioned embodiment balls are used as the rolling members provided between the lower plate and the intermediate plate and between the intermediate plate and the upper plate, it is also possible to use rollers. When using rollers, it is possible to adopt a so-called cross roller type structure, in which rollers differing in rotation axis direction by 90° are arranged alternately.

FIGS. 5 through 8 show a construction in which the XY guide table of the present invention shown in FIG. 1 is provided with a means for driving the intermediate plate 3 and the upper plate 4. The structure of the lower plate 2, the intermediate plate 3, and the upper plate 4 is completely the same as that shown in FIG. 1, so a description thereof will be omitted.

Figure 5:
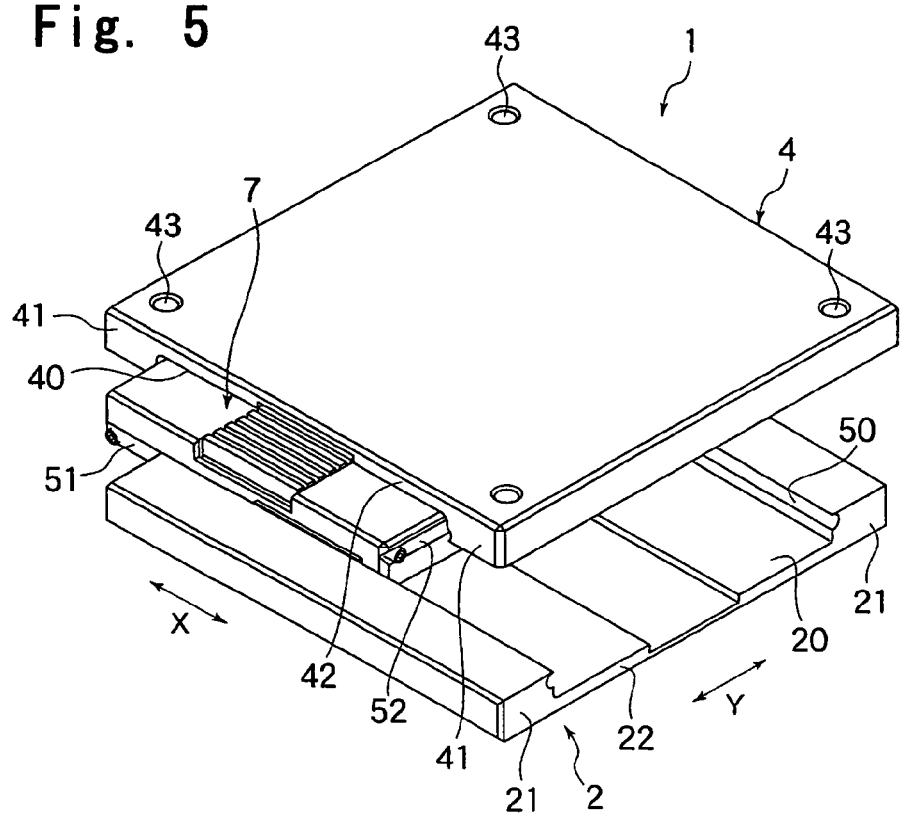
FIG. 5 is a perspective view showing how an ultrasonic motor is incorporated as a driving means into the XY guide table shown in FIG. 1.
Figure 6:
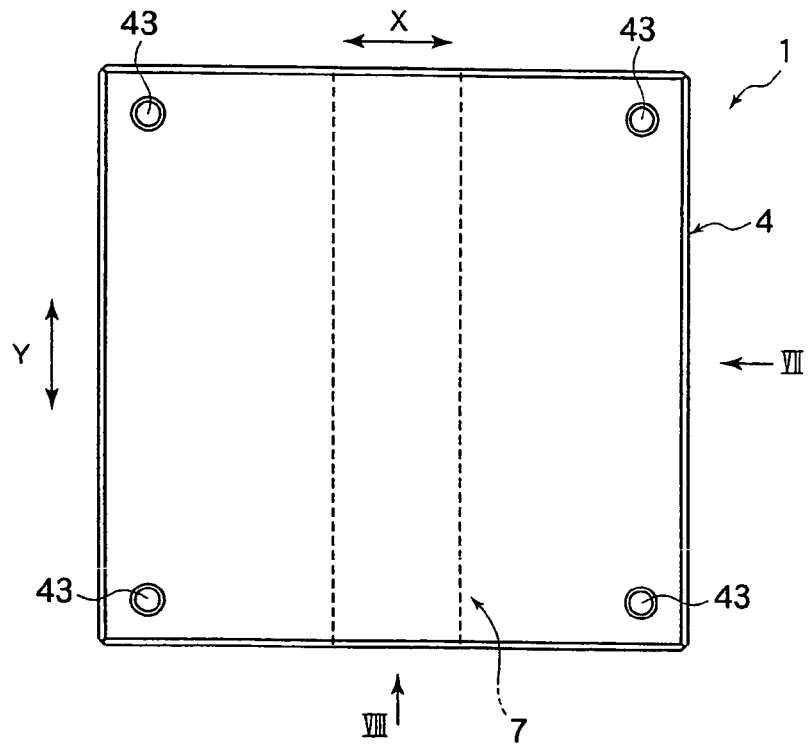
FIG. 6 is a plan view of the XY guide table shown in FIG. 5.
Figure 7:
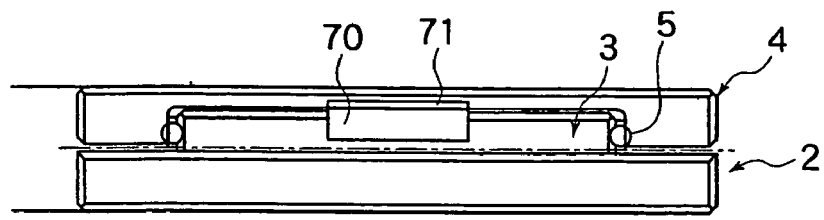
FIG. 7 is a view taken in a direction of an arrow VII of FIG. 6.
Figure 8:
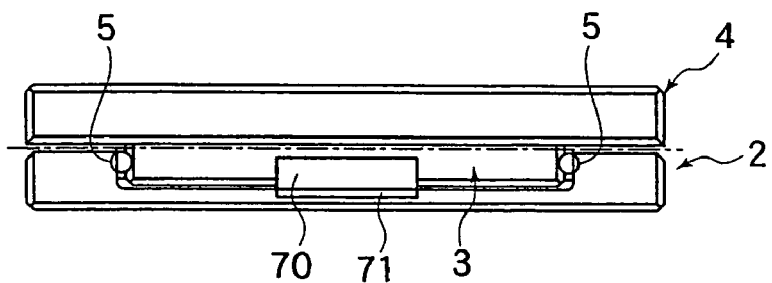
FIG. 8 is a view taken in a direction of an arrow VIII of FIG. 6.
Figure 9:
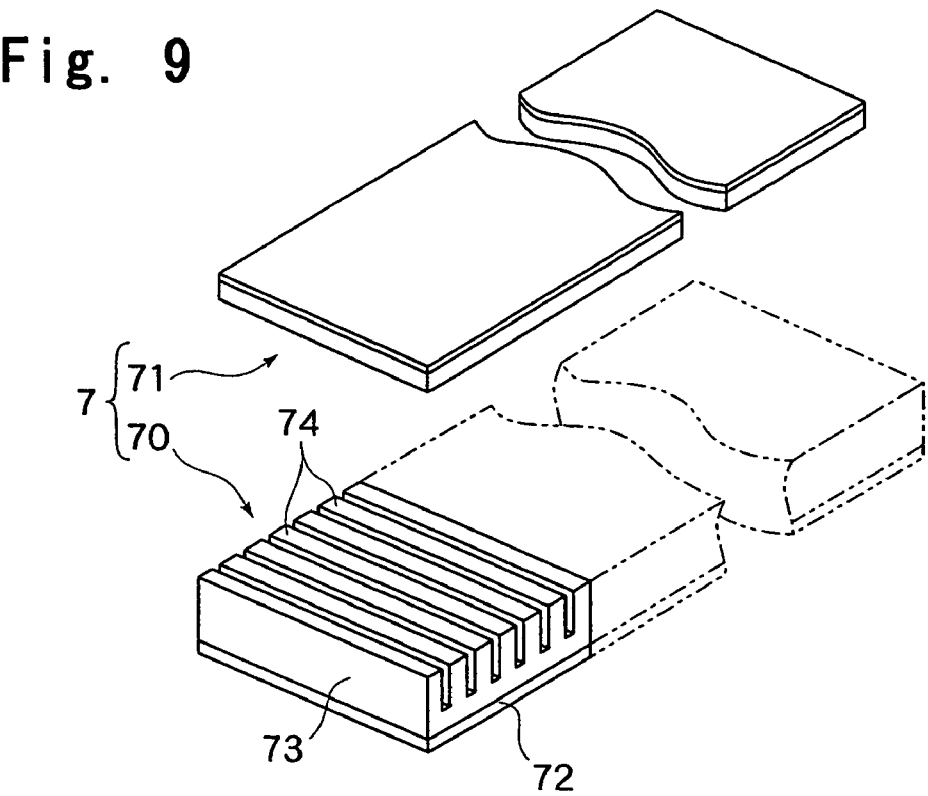
FIG. 9 is an exploded perspective view showing the construction of the ultrasonic motor.
Figure 10:
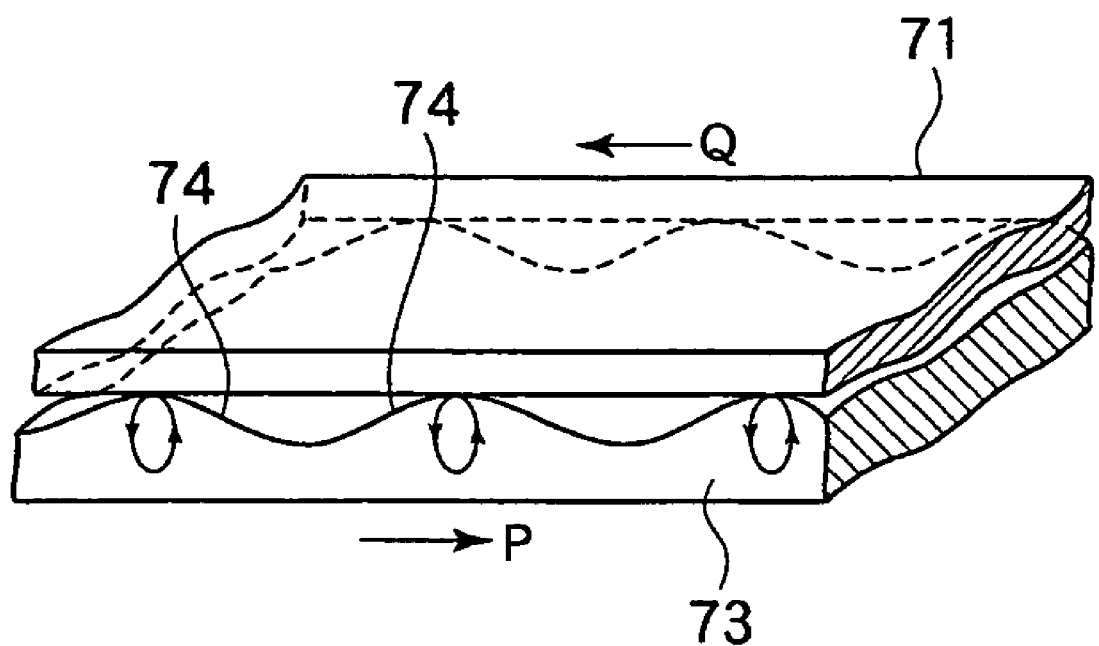
FIG. 10 is a diagram illustrating the operation principle of the ultrasonic motor.

In the example shown in FIG. 5, an ultrasonic linear motor 7 is used as the means for driving the intermediate plate 3 in the X-direction with respect to the lower plate 2 and for driving the upper plate 4 in the Y-direction with respect to the intermediate plate 3. As shown in FIG. 9, the ultrasonic linear motor 7 is composed of a stator 70 equipped with a piezoelectric element, and a movable element 71 formed of a sheet metal and held in press contact with the stator 70. The stator 70 is formed by stacking an oscillator 73 formed of an elastic material on a piezoelectric element 72, and a plurality of comb teeth 74 are arranged on the oscillator 73 in the direction in which the movable element 71 is conveyed. When an AC voltage of a specific frequency is applied to the piezoelectric element 72, the piezoelectric element 72 is warped, whereby an elliptical motion as shown in FIG. 10 is generated at the distal end of each of the comb teeth 74 constituting the oscillator 73, with the result that a progressive wave in a direction of an arrow P or in a direction of an arrow Q is formed in the oscillator 73. As a result, the movable element 71 in press contact with the oscillator 73 of the stator 70 is conveyed in the direction of the arrow P or in the direction of the arrow Q.

The movable element 71 of the ultrasonic linear motor 7, constructed as described above, is mounted to the center of the storage groove 20 of the lower plate 2, and the stator 70 thereof is mounted to the lower half of the intermediate plate 3 at a position opposed to the movable element 71. At the center of the storage groove 20 of the lower plate 2, that is, at the center of the connecting bottom plate 22, there is formed a groove for fixing the movable element 71 in the X-direction, and the movable element 71 is fit-engaged with this groove. The movable element 71 itself is only a thin metal plate, so its thickness is smaller than that of the connecting bottom plate 22, which means it can be fixed in position so as to be embedded in the connecting bottom plate 22. Through appropriate selection of the frequency of the voltage applied to the piezoelectric element 72, the stator 70 of the ultrasonic motor 7 can be formed sufficiently thin, so it can be embedded in the lower half of the intermediate plate 3. Similarly, the movable element 71 of the ultrasonic liner motor 7 is mounted to the center of the storage groove 40 of the upper plate 4, and the stator 70 thereof is mounted to the upper half of the intermediate plate 3 at a position opposed to the movable element 71.

In this way, it is possible to incorporate the ultrasonic motor 7 into the XY guide table 1 shown in FIG. 1 without having to change the thickness and size of the lower plate 2, the intermediate plate 3, and the upper plate 4; by driving the ultrasonic motor 7, it is possible to freely feed the intermediate plate 3 in the X-direction with respect to the lower plate 2, and to freely feed the upper plate 4 in the Y-direction with respect to the intermediate plate 3. That is, it is possible to provide a very compact XY guide table making it possible to freely effect positioning within a two-dimensional plane.

Figure 11:
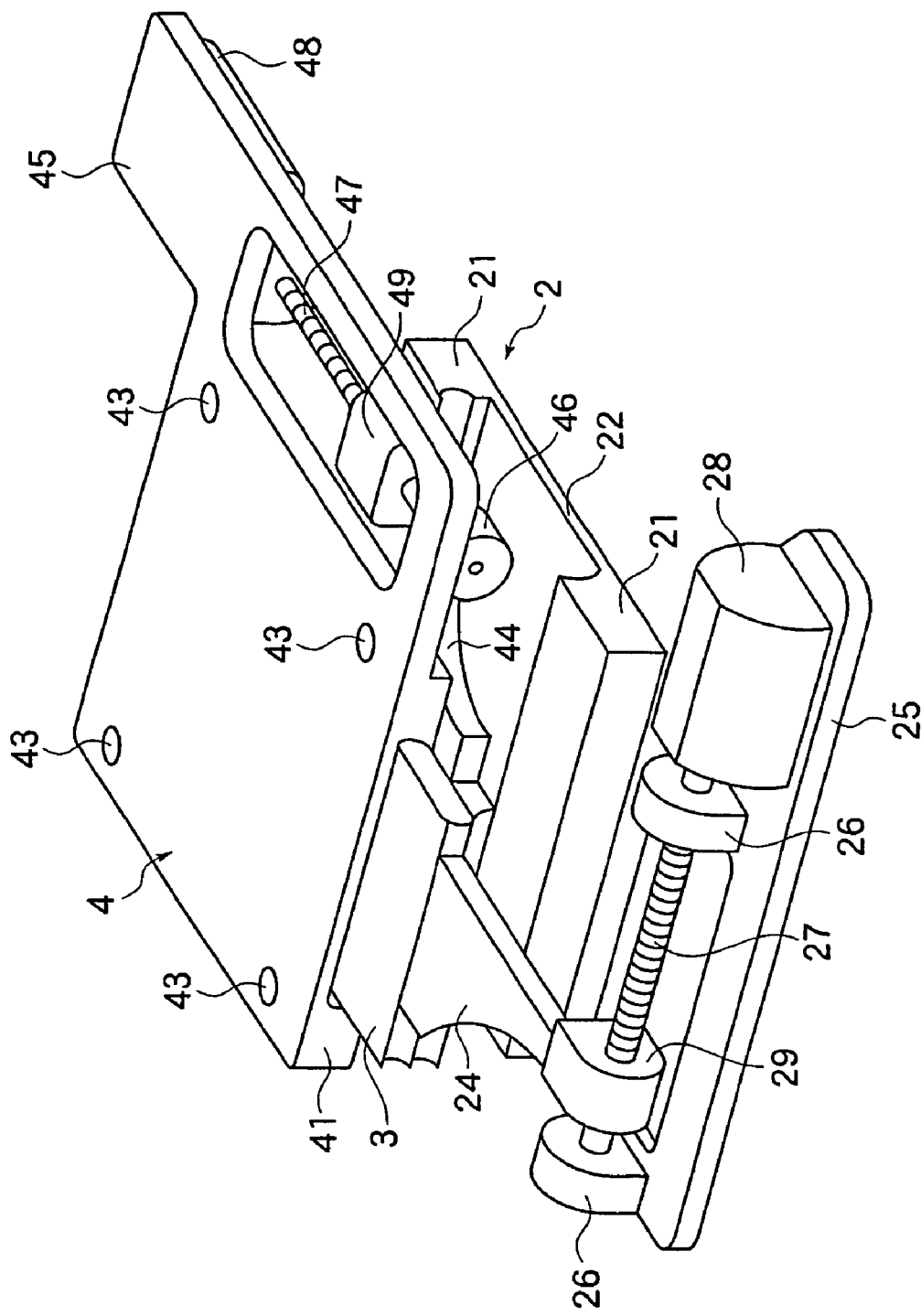
FIG. 11 is a perspective view showing how a ball screw is incorporated as the driving means into the XY guide table shown in FIG. 1.

Further, in effecting positioning on the XY guide table of the present invention within a two-dimensional plane, it is also possible to use, instead of the ultrasonic motor 7, a ball screw as shown in FIG. 11. In the example shown in FIG. 11, a base plate 25 constituting a motor mounting portion protrudes from a side of the lower plate 2, and a screw shaft 27 of a ball screw is rotatably mounted on the base plate 25 through the intermediation of support bearings 26, with the output shaft of a first motor 28 fixed to the base plate 25 being connected with the screw shaft 27. On the other hand, a nut member 29 constituting the ball screw is threadedly engaged with the screw shaft 27, and the nut member 29 is connected with the intermediate plate 3 through the intermediation of a first drive arm 24. The first drive arm 24 is connected with the upper half of the intermediate plate 3; when the first motor 28 is driven to rotate, the rotation is converted to a linear motion of the first drive arm 24 by the ball screw 27, and the intermediate plate 3 is driven in the X-direction.

Further, a side flange portion 45 protrudes from a side of the upper plate 4, and a screw shaft 47 of a ball screw is rotatably mounted to the lower side of the side flange portion 45 through the intermediation of a support bearing 46; the output shaft of a second motor 48 protruding vertically downwards from the side flange portion 45 is connected with the screw shaft 47. On the other hand, a nut member 49 constituting the ball screw is threadedly engaged with the screw shaft 47, and the nut member 49 is connected with the intermediate plate 3 through the intermediation of a second drive arm 44. The second drive arm 44 is connected with the lower half of the intermediate plate 3; when the second motor 48 is driven to rotate, the rotation is converted to a linear motion of the second drive arm 44 by the ball screw, and the intermediate plate 3 is driven in the Y-direction.

In this construction, by imparting an arbitrary rotation amount and an arbitrary rotating direction to the first motor 28 and the second motor 48, it is possible to move the upper plate 4 freely in the X-direction and the Y-direction with respect to the lower plate 2, thus making it possible to effect positioning at an arbitrary position.

The invention claimed is:

1. An XY guide table, comprising:
a lower plate;
an intermediate plate assembled to the lower plate through intermediation of a large number of rolling members and capable of moving in an X-direction; and
an upper plate assembled to the intermediate plate through intermediation of a large number of rolling members and capable of moving in a Y-direction which is orthogonal to the X-direction, wherein:
each of the lower plate and the upper plate has a pair of rail bodies of a substantially rectangular sectional configuration, in which mounting holes for fastening members are formed, and a connecting plate portion connecting the rail bodies, and is formed in a substantially channel-shaped configuration having between the pair of rail bodies a storage groove whose width corresponds to a width of the connecting plate portion, with a rolling member rolling groove being formed in a side surface of each rail body facing the storage groove;
the upper plate and the lower plate are stacked together, with the respective storage grooves of those being opposed and orthogonal to each other; and
the intermediate plate is formed in a substantially rectangular configuration, and has a lower half thereof loosely fitted into the storage groove of the lower plate and an upper half thereof loosely fitted into the storage groove of the upper plate, with rolling member rolling grooves being formed at positions thereof opposed to the rolling member rolling grooves formed in the rail bodies of the lower plate and the upper plate.

2. The XY guide table according to claim 1, wherein the lower plate and the upper plate are formed in the same configuration and in the same size, and are stacked together at a center of a movable range in the X-direction and the Y-direction of the upper table without sticking out.

3. The XY guide table according to claim 1, wherein rolling member cages for aligning the large number of rolling members rolling in the rolling member rolling grooves are arranged between the rail bodies of the lower plate and the lower half of the intermediate plate and between the rail bodies of the upper plate and the upper half of the intermediate plate.

4. The XY guide table according to claim 1, wherein an ultrasonic motor for driving the lower table in the X-direction is incorporated into the lower half of the intermediate plate, and an ultrasonic motor for driving the upper table in the Y-direction is incorporated into the lower half of the intermediate plate.

5. The XY guide table according to claim 1, wherein the lower plate is provided with a first motor and a ball screw for converting a rotating motion of the first motor to a linear motion in the X-direction of the intermediate plate, and the upper plate is provided a second motor and a ball screw for converting a rotating motion of the second motor to a linear motion in the Y-direction of the intermediate plate.

* * * * *